Figure 1:
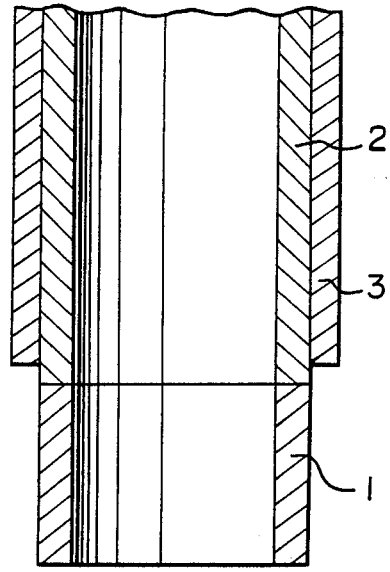

United States Patent [19]

Hayashi et al.

[11] Patent Number: 4,798,769
[45] Date of Patent: Jan. 17, 1989

[54] ELECTRODE SUPPORTING CONDUIT TUBE FOR ELECTRICAL HEATING OF UNDERGROUND HYDROCARBON RESOURCES

[75] Inventors: Osamu Hayashi, Toyonaka; Sadamu Matsuda, Amagasaki; Ichiro Takahashi, Suita; Goro Okamoto, Itami; Kazuo Okahashi, Toyonaka, all of Japan

[73] Assignee: Mitsubishi Denki Kabushiki Kaisha, Tokyo, Japan

[21] Appl. No.: 14,207

[22] Filed: Feb. 5, 1987

Related U.S. Application Data

[63] Continuation of Ser. No. 837,661, Mar. 7, 1986, abandoned, which is a continuation of Ser. No. 606,189, May 2, 1984, abandoned.

[30] Foreign Application Priority Data

Jun. 17, 1983 [JP] Japan .................. 58-109649

[51] Int. Cl.[4] .................. B32B 15/08; F16L 9/14
[52] U.S. Cl. .................. 428/460; 428/34.5; 138/145
[58] Field of Search ........... 428/36, 460; 138/145; 174/110 R, 110 E

[56] References Cited

U.S. PATENT DOCUMENTS

| | | | |
|---|---|---|---|
| 3,946,809 | 3/1976 | Hagedorn . | |
| 4,192,697 | 3/1980 | Parker et al. | 156/188 |
| 4,320,224 | 3/1982 | Rose et al. | 528/125 |
| 4,360,630 | 11/1982 | Smith | 524/592 |
| 4,394,417 | 7/1983 | Hilker | 428/383 |
| 4,421,588 | 12/1983 | Davies | 156/308.2 |
| 4,507,468 | 3/1985 | Kawabata et al. | 528/388 |
| 4,528,346 | 7/1985 | Sugie et al. | 525/523 |
| 4,577,664 | 3/1986 | Takahashi et al. | 138/149 |
| 4,592,782 | 6/1986 | Davies | 75/253 |

FOREIGN PATENT DOCUMENTS 1022062  4/1975  Canada .

OTHER PUBLICATIONS

1983–84 Modern Plastics Encyclopedia, p. 54 & p. 489.

Primary Examiner—John E. Kittle
Assistant Examiner—P. J. Ryan
Attorney, Agent, or Firm—Oblon, Fisher, Spivak, McClelland, & Maier

[57]  ABSTRACT

An electrode supporting conduit tube for electrical heating of underground hydrocarbon resources comprises a metal conduit tube and an insulating member adhered on and around the outer peripheral surface of the metal conduit tube. The insulating member is a laminated body of a web of glass fiber impregnated with water-dispersion varnish of a hot-water resistant and thermoplastic resin and a polyether/ether/ketone resin film, which is formed by first alternately winding the glass fiber web and the resin film on and around the outer peripheral surface of the metal conduit tube for a plurality of winding turns, and then subjecting both polyether/ether/ketone resin film and glass fiber web thus wound on and around the metal conduit tube to shaping under heat and pressure at a heating temperature of from 350° C. to 450° C, and under a pressure of from 10 kg/cm$^2$ to 200 kg/cm$^2$.

3 Claims, 1 Drawing Sheet

ELECTRODE SUPPORTING CONDUIT TUBE FOR ELECTRICAL HEATING OF UNDERGROUND HYDROCARBON RESOURCES

This application is a continuation of application Ser. No. 837,661, filed on Mar. 7, 1986, now abandoned, which is a continuation of parent application Ser. No. 606,189, filed May. 2, 1984, now abandoned.

This invention relates to an electrode supporting conduit tube for electrically heating underground hydrocarbon resources. More particularly, the present invention is concerned with an electrode supporting conduit tube for electrical heating of such underground hydrocarbon resrouces, which is covered with electrically insulating materials and is used when the underground hydrocarbon resources are to be extracted by means of the electrical heating method.

Throughout the present specification, the term "underground hydrocarbon resources" refers to bituminous substances continued in oil sand or tar sand, hence it will be called hereinafter "oil sand", unless otherwise specified.

In recent years, with steep rise in price of the oil resources, extraction of the oil content from deposit of oil sand laid under the ground in Canada, Venezuela, and some other countries has been being put into operations in full scale. The deposit of the oil sand usually exists under the ground as deep as a few to several hundred meters and in a layer of approximately 50 meters or so thick. However, since this oil sand is highly viscous, it can not be taken out of the earth by pumping-up operation at a normal temperature. It has therefore been a practice so far to employ a method, by which heated water vapor is ejected into and through the oil sand deposit to raise the temperature of the oil content in the deposit and lower its viscosity, thereby enabling the oil content to be pumped up.

This method, however, is so poor in its operating efficiency that it inevitably pushes up the operating cost for the extraction. On account of such shortcoming in the conventional method of extraction, there has been proposed a method of oil extraction with better operating effeciency and higher productivity, according to which a pair of conduit tubes of steel or stainless steel with an electrode part being attached to, and held at, the bottom end part of each of them are buried deep under the ground so that the electrode part may arrive at the oil sand deposit, while they are separated each other at a distance in a range of from about 30 to 200 meters; and then a high tension voltage of from several hundreds to several thousands volts is applied across the two electrodes to raise the temperature of the oil sand deposit with the Joule heat so as to reduce viscosity of the oil sand.

In this latter method of oil extraction, since the oil sand deposit has resistivity which is several times as high as that of the ground stratum above the deposit, it is imperative that the portion of the conduit tube to be buried in the ground stratum be covered with an electrically insulating material so as not to permit electric current to flow in and through the ground layer above the oil sand deposit. Unless this portion of the conduit tube is covered with the electrically insulating material, electric current flows in and through the ground layer alone, and no current flows across the electrodes buried in the oil sand deposit. As the consequence of this, there have been rising demands for development of the electrode supporting conduit tube covered with the electrically insulating material and being capable of withstanding such special conditions in its use.

The characteristics, which the electrically insulating material should posses, are as follows:

(a) it has a voltage withstand characteristic of from several hundreds to several thousands volts and a volume resistivity value of $10^6$ ohm-cm and above, not only at a normal temperature level, but also at a temperature level of about 300° C., at which viscosity of the oil content in the oil sand deposit can be decreased;

(b) it is durable against hot water of approximately 300° C. in order that water contained in the oil sand deposit may be heated to a temperature of about 300° C., at which viscosity of the oil sand deposit can be decreased; and (c) it has a mechanical strength of such a degree that can support the electrode from the bottom end part of the conduit tube with the electrically insulating material being provided around it, and also has a mechanical impact strength of such a degree that does not bring about breakage of the electrically insulating material around the conduit tube by its contact with the wall of the bore-hole, when the electrode supported on and suspended from the bottom end part of the conduit tube is buried into the oil sand deposit through the bore-hole for burying.

The present invention has been made with a view to answering the above-described various demands, and aims at providing an electrode supporting conduit tube for electrically heating the underground hydrocarbon resources, which is provided thereon with an electrically insulative covering excellent in its voltage withstand characteristic, heat-resistant property, and mechanical strength.

The present inventors conducted strenuous and continuous researches and studies to develop the electrode supporting conduit tube covered with an electrically insulating material and having all the characteristics as mentioned in the above items (a) to (c). As a result, they discovered that such electrode supporting conduit tube covered with the electrically insulating material and having all the characteristics as mentioned above could be obtained by winding alternately on the outer peripheral surface of a metal conduit tube a film of polyether-/ether/keytone resin (hereinafter abbreviated as "PEEK") and a web of glass fiber impregnated with water-dispersion varnish of PEEK or polyphenylene sulfide resin (hereinafter abbreviated as "PPS"), then pressing the outer periphery of the metal conduit tube with the PEEK film and the PEEK- or PPS-impregnated glass fiber web laminated around it by use of a metal mold, and subjecting the PEEK film and the particles of PEEK or PPS in the water-dispersion varnish and impregnated in the glass fiber web to melting and shaping under heat and pressure at a temperature in a range of from 350° C. to 450° C. and under a pressure in a range of from 10 to 100 kg/cm². Based on this finding, the present invention has been brought to completion.

According to present invention, in one aspect of it, there is provided an electrode supporting conduit tube for electrical heating of underground hydrocarbon resources, which comprises: a metal conduit tube; and an electrically insulative covering adhered on and around the outer peripheral surface of said metal conduit tube, the insulative covering being composed of lamination of a plurality of layers of polyether/ether/keytone resin film, and glass fiber web impregnated with water-dispersion varnish of polyether/ether/keytone resin or polypheylene sulfide resin, which are alternately wound on and around the metal conduit tube and subjected to shaping under heat and pressure.

According to the present invention, in another aspect of it, there is provided a method for manufacturing the electrode supporting conduit tube for electrical heating of underground hydrocarbon resources, which comprises alternately winding for a plurality of numbers of times, on the outer peripheral surface of a metal conduit tube, a film of polyether/ether/ketone resin, and a web of glass fiber impregnated with water-dispersion varnish of polyether/ether/ketone resin or polyphenylene sulfide resin, and subjecting the outer periphery of the metal conduit tube with the coating layers to heat the pressure into a required shape of the electrically insulating member at a temperature in a range of from 350° C. to 450° C. and under a pressure in a range of from 10 kg/cm² to 200 kg/cm².

The foregoing object, other objects as well as the specific material used and the manner of forming the laminated insulative covering according to the present invention will become more apparent and understandable from the following detailed description of preferred examples thereof, when read in conjunction with the accompanying drawing.

Figure 2:
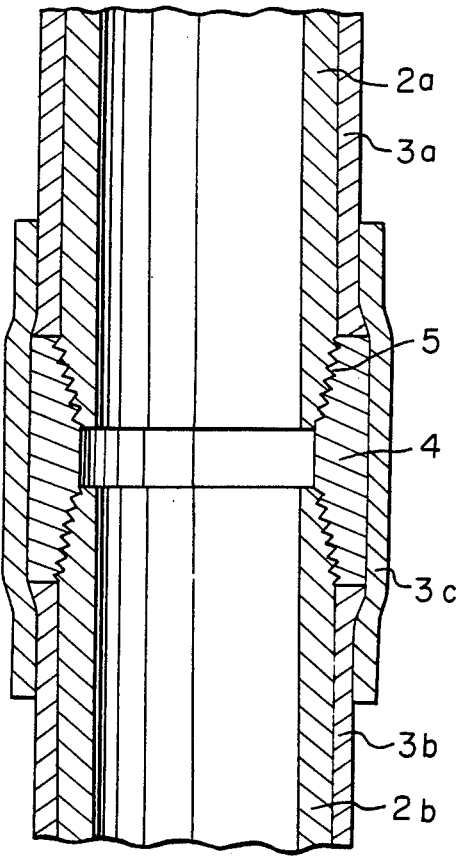

In the accompanying drawing:

FIG. 1 is a longitudinal cross-sectional view, in part, showing the bottom end part of the electrode supporting conduit tube covered with the electrically insulating material, according to one embodiment of the present invention; and FIG. 2 is a longitudinal cross-sectional view showing a joined portion of the electrode supporting conduit tube shown in FIG. 1.

For the PEEK resin to be used for the purpose of the present invention, there may be exemplified, for example, aromatic polyether/ether/ketones developed by Imperial Chemical Industries, Ltd., England, which can be represented by the following structural formula.

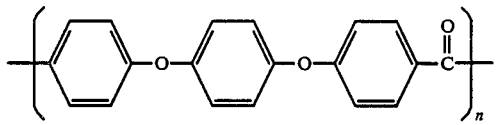

The PEEK film used in the present invention has a thickness of from 0.01 to 0.40 mm, or preferably from 0.02 to 0.30 mm, When the film thickness is less than 0.01 mm, the film is prone to be readily broken by tension applied to it, when it is wound on and around the metal conduit tube in an attempt not to produce any clearance between the film layers or between the film layer and the glass fiber layer with the consequence that the film can not be tightly wound on and around the metal conduit tube. On the other hand, when the film thickness is more than 0.40 mm, the film exhibits large repulsive force to make it difficult to wind the film on and around the conduit tube with the film layers being maintained in close contact among them. As the consequence of this, there is formed a clearance between the film layers or between the film layer and the glass fiber layer to entrap air bubbles in the interior of the laminated layers of the insulating material at the time of applying heat and pressure to them for shaping, whereby it becomes impossible to obtain the insulative covering which is excellent in its hot-water resistant property and electrical characteristics.

Power of PEEK resin for preparing the water dispersion varnish of the PEEK resin should preferably have a particle size ranging from 0.5 to 10 μm. When the particle size is smaller than 0.5 μm, the powder particles bring about agglomeration to reduce a rate of impregnation of the PEEK resin particles into intertwinement of the glass fiber filament. On the other hand, when the particle size is larger than 10 μm, the PEEK resin particles do not penetrate into intertwinement of the glass fiber filament, which inevitably causes entrapment of air bubbles in the interior of the laminated layers of the insulating material at the time of applying heat and pressure to them for shaping to make it impossible to provide the insulative covering excellent in its hot-water resistant property and electrical characteristics.

For the PPS resin to be used in the present invention, there may be exemplified, for example, those available in general market such as "Lighton" (a trade name of a product of Phillips Petroleum Co., U.S.A.), "Susteel" (a trade name of a product of Hodogaya Chemical Industries, Co., Ltd., Japan), and so forth, which can be represented by the following structural formula.

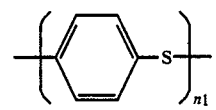

Powder of PPS for preparing the water-dispersion varnish of PPS should preferably have a particle size ranging from 0.5 to 10 μm. When the particle size is smaller than 0.5 μm, the powder particles bring about agglomeration to reduce a rate of penetration of the PPS resin particles into intertwinement of the glass fiber filament. On the other hand, when the particle size is larger than 10 μm, the PPS resin particles do not penetrate into intertwinement of the glass fiber filament, which inevitably causes entrapment of air bubbles in the interior of the laminated layers of the insulating material at the time of applying heat and pressure to them for shaping, whereby it becomes impossible to provide the insulative covering having excellent hot-water resistant property and electrical characteristics.

The glass fiber for use in the present invention may be in any arbitrary shape such as woven cloth, tape, roving, and so forth.

For the metal conduit tube, there may preferably be used steel tube, or stainless steel tube, or the like which is excellent in its corrosion-resistant property and has good electrical conductivity. While length of the conduit tube is determined by depth of the oil sand deposit existing under the ground, it is usually required to have a length in total of from 200 meters to 600 meters, or so.

In the following, explanations will be given as to the manufacturing process of the electrode supporting conduit tube according to the present invention.

At first, PEEK resin film and glass fiber impregnated with water-dispersion varnish of PEEK or PPS resin with a rate of adhesion of PEEK or PPS resin particles thereon being in a range of from 20 to 60% by weight are alternately wound on and around the metal conduit tube, after which a pressure of from 10 kg/cm² to 100 kg/cm² is applied to the entire outer peripheral surface of the tube by use of a metal mold, while heating the conduit tube with the PEEK resin film and the glass fiber impregnated with PEEK or PPS resin dispersion varnish wound on and around it to a temperature level of from 350° C. to 450° C. to melt the PEEK resin film and the PEEK or PPS resin particles to be fused with the glass fiber, whereby the required insulative covering can be formed.

If the heat-melting temperature is lower than 350° C., the melt-viscosity of the PEEK resin remains still high and the air bubbles within the insulative covering cannot be expelled from its interior, hence it is not possible to provide the insulative covering excellent in its hot-water resistant property and electrical characteristics. On the other hand, if the heat-melting temperature is higher than 450° C., there takes place heat deterioration with PEEK and PPS resins, whereby it is also not possible to provide the insulative covering excellent in its hot-water resistant property, mechanical characteristics, and electrical characteristics.

Note by the abovementioned mode of embodiment of the present invention, when the insulative covering made up of a composite material of PEEK resin film and glass fiber is formed on the outer peripheral surface of the metal conduit tube by alternately winding the PEEK resin film and the glass fiber web on and around the outer peripheral surface of the metal conduit tube, pressing the outer peripheral surface thereof with use of a metal mold, and heat-melting the laminated insulative covering material at a temperature of from 350° C. to 450° C. and under a pressure of from 10 kg/cm$^2$ to 200 kg/cm$^2$, the PEEK resin does not penetrate deep inside the glass fiber, but air bubbles are entrapped in the interior of the insulative covering to make it unable to provide the insulative covering having excellent hot-water resistant property and electrical characteristics.

Also, when polyamide, polycarbonate, polybutyrene terephthalate, ABS, AS, polystyrene, or polyethylene terephthalate is used as the resin for preparing the water-dispersion varnish to be impregnated into the glass fiber, the resulting insulative covering brings about heat-deterioration in hot water of 300° C., whereby it is not possible to provide the insulative covering excellent in its mechanical characteristics and electrical characteristics.

In contrast to this, the insulative covering according to the present invention, which is formed on the outer peripheral surface of the metal conduit tube by alternately winding the PEEK resin film and the glass fiber web impregnated with water-dispersion varnish of PEEK or PPS resin having hot-water resistant property and thermoplasticity on and around the outer peripheral surface of the metal conduit tube, and then confining the outer peripheral surface thereof in a metal mold and subjecting the laminated materials to shaping by applying heat and pressure thereto at a predetermined temperature and under a predetermined pressure, is free from the air bubbles in its interior and is durable against hot-water of 300° C., hence it is suitable as the insulative covering for the electrode supporting conduit tube for electrically heating the oil sand deposit.

In the following, explanations will be given in reference to the accompanying drawing as to the actual embodiment of the electrode supporting conduit tube covered with the electrically insulating member in accordance with the present invention.

FIG. 1 illustrates the bottom end part of the electrode supporting conduit tube covered with the electrically insulating material, in which the insulative covering 3 formed by the above mentioned process steps is provide on the outer peripheral surface of the metal conduit tube 2 with an electrode 1 being joined and supported thereon.

In general, the metal conduit tube is required to have a length of from approximately 200 meters to 600 meters. However, since ordinary steel tube and stainless steel tube have a length per piece of from 5 to 50 meters, a plurality of individual conduit tubes are sequentially joined and inserted into the oil sand deposit.

FIG. 2 illustrates a joined portion of the metal conduit tube covered with the electrically insulating member. As illustrated, when the metal conduit tube 2a covered with the insulating member 3a and the metal conduit tube 2b covered with the electrically insulating member 3b are to be joined together, the distal end part of each of the metal conduit tubes 2a and 2b is screw-threaded in a tapered shape on its outer peripheral surface, as designated by a reference numeral 5, through which both conduit tubes are joined together by use of a coupling 4. In this case, the joined portion (i.e., the outer peripheral surface of the coupling 4 and each end part of the metal conduit tubes) is further coated with the insulating member 3c to perfectly enshroud the joined portion so as to prevent electric current from leaking from that joined portion.

In the following, further detailed explanations will be given as to the method of covering the metal conduit tube with the insulating film 3, 3a, 3b, or 3c as well as the properties of such insulating film in reference to various actual examples of the present invention and comparative examples, though the invention is not limited to these examples alone.

EXAMPLE 1

A strip of tape having thickness of 0.10 mm and width of 30 mm and made of PEEK resin film was wound half-lap on and around the outer peripheral surface of a metal conduit tube for a single winding turn. Over and around this resin film, there was also wound half-lap for a single winding turn another strip of tape of glass fiber with the PEEK resin particles having been impregnated therein at a rate of 30% by weight, and having thickness of 0.20 mm and width of 30 mm. The winding operation of these strips of tape of PEEK resin film and tape of glass fiber was carried out for additional four times, thus repeating the winding operation for five times in all. Over and around this lamination, there was further wound half-lap for a single winding turn the PEEK resin film of 0.10 mm thick and 30 mm wide. In this way, composite layers of the PEEK resin film and the glass fiber with the PEEK resin particles having been impregnated therein were formed on the outer peripheral surface of the metal conduit tube to a thickness of 3.2 mm. Subsequently, the metal conduit tube with the composite layers having been wound around it was confined in a quartered metal mold, and then was subjected to heating in an electric furnace of 380° C. under pressure of 100 kg/cm$^2$, thereby forming on the metal conduit tube a composite insulating member of PEEK resin and the glass fiber.

The Table below, in each of the columns for Example 1, indicates the adhesive strength (kg/cm$^2$) and the voltage withstand value (KV/mm) of the thus obtained insulating member at 25° C.; and also the adhesive strength (kg/cm$^2$) and the voltage withstand value (KV/mm) of the same insulating member measured at 25° C. after it was subjected to a hot-water cycle of immersing the insulating member in water, heating it to 300° C., maintaining the member in hot water of 300° C. for 500 hours, and cooling it down to 25° C.

EXAMPLES 2 to 13

The same experiments as in Example 1 above were conducted with the exception that structures and shaping conditions of the composite insulating layer were replaced by those as shown in the Table below, thereby forming the electrically insulating member on the outer peripheral surface of the metal conduit tube. The characteristics of the thus obtained insulating member are shown in the columns for Examples 2 to 13 in Table below.

EXAMPLE 14

The same experiment as in Example 1 above was conducted with the exception that a glass roving having breadth of 0.40 mm and impregnated with PEEK resin particles at a rate of 30% by weight was wound in parallel on the PEEK resin film, in place of the half-lap winding of the strip of the glass fiber tape, thereby forming the electrically insulating member on the outer peripheral surface of the metal conduit tube. The characteristics of the thus obtained insulating member are shown in the Table below in the column for Example 14.

COMPARATIVE EXAMPLES 1 to 13

The same experiments as done in Example 1 above were conducted with the exception that structures or shaping conditions of the composite insulating layer were replaced by those as shown in the Table below, thereby forming the electrically insulating member on the outer peripheral surface of the metal conduit tube under the conditions outside the range of the present invention. The characteristics of the thus obtained insulating member are shown in the columns for Comparative Examples 1 to 13 in the Table.

As is apparent from the results shown in the Table below, the electrode supporting conduit tube with the electrically insulating member being formed thereon in accordance with the present invention is effectively suitable for use in extracting the underground hydrocarbon resources by the electrical heating method, because the insulating member is excellent in its electrical, mechanical, and hot-water resistant properties.

In the foregoing, the present invention has been described in specific details with reference to preferred examples thereof. It should, however, be noted that these examples are illustrative only and not so restrictive, and that any changes and modifications may be made by those persons skilled in the art within the spirit and scope of the present invention as recited in the appended claims.

TABLE

| | Construction of Electrical Indulating Member | | | | | |
|---|---|---|---|---|---|---|
| | Glass Fiber | | | | Water-Dispersion Varnish | |
| | Shape | Thickness (mm) | Rate of Impregnation of Powder Material (wt. %) | Number of Winding Turn (Times) | Resin Used | Particle Size of Powder (μm) |
| Example No. | | | | | | |
| 1 | Tape | 0.20 | 30 | 1 | PEEK | 3 |
| 2 | " | 0.20 | 30 | 1 | " | 3 |
| 3 | " | 0.20 | 30 | 1 | " | 3 |
| 4 | " | 0.20 | 30 | 1 | " | 3 |
| 5 | " | 0.20 | 30 | 1 | " | 3 |
| 6 | " | 0.20 | 30 | 1 | " | 3 |
| 7 | " | 0.40 | 30 | 1 | " | 3 |
| 8 | " | 0.20 | 30 | 1 | " | 0.5 |
| 9 | " | 0.20 | 30 | 1 | " | 10 |
| 10 | " | 0.20 | 10 | 1 | " | 3 |
| 11 | " | 0.20 | 50 | 1 | " | 3 |
| 12 | " | 0.20 | 30 | 1 | PPS | 3 |
| 13 | Cloth | 0.20 | 30 | 1 | PEEK | 3 |
| 14 | Roving | 0.40 | 30 | 1 | " | 3 |
| Comparative Example No. | | | | | | |
| 1 | Tape | 0.20 | 30 | 1 | " | 3 |
| 2 | " | 0.20 | 30 | 1 | " | 3 |
| 3 | " | 0.20 | 30 | 1 | " | 0.1 |
| 4 | " | 0.20 | 30 | 1 | " | 15 |
| 5 | " | 0.20 | 5 | 1 | " | 3 |
| 6 | " | 0.20 | 30 | 1 | Polyamide | 3 |
| 7 | " | 0.20 | 30 | 1 | Polycarbonate | 3 |
| 8 | " | 0.20 | 30 | 1 | Polybutylene terephthalate | 3 |
| 9 | " | 0.20 | 30 | 1 | ABS | 3 |
| 10 | " | 0.20 | 30 | 1 | AS | 3 |
| 11 | " | 0.20 | 30 | 1 | Polyethylene terephthalate | 3 |
| 12 | " | 0.20 | 30 | 1 | Polystyrene | 3 |
| 13 | " | 0.20 | 0 | 1 | — | — |

| | Construction of Electrical Indulating Member | | | | Characteristic Values | | | |
|---|---|---|---|---|---|---|---|---|
| | PEEK Film | | Number of Repetition of Winding Operation (Times) | Shaping Condition | | Initial Values | | Hot-Water Test (after 500 hrs.) | |
| | Thickness (mm) | Number of Winding Turn (Times) | | Temperature (°C.) | Pressure (kg/cm²) | Adhesive Strength (kg/cm²) | Voltage Withstand (KV/mm) | Adhesive Strength (kg/cm²) | Voltage Withstand (KV/mm) |
| Example No. | | | | | | | | | |

TABLE-continued

| | | | | | | | | | |
|---|---|---|---|---|---|---|---|---|---|
| 1 | 0.10 | 1 | 5 | 380 | 100 | 215 | 33 | 205 | 30 |
| 2 | 0.10 | 1 | 5 | 380 | 10 | 205 | 32 | 190 | 29 |
| 3 | 0.10 | 1 | 5 | 380 | 200 | 230 | 35 | 200 | 33 |
| 4 | 0.10 | 1 | 5 | 350 | 100 | 190 | 31 | 180 | 28 |
| 5 | 0.10 | 1 | 5 | 450 | 100 | 210 | 30 | 190 | 26 |
| 6 | 0.01 | 10 | 5 | 380 | 100 | 210 | 29 | 195 | 25 |
| 7 | 0.40 | 1 | 3 | 380 | 100 | 205 | 30 | 180 | 27 |
| 8 | 0.10 | 1 | 5 | 380 | 100 | 215 | 32 | 190 | 28 |
| 9 | 0.10 | 1 | 5 | 380 | 100 | 220 | 33 | 200 | 30 |
| 10 | 0.10 | 1 | 5 | 380 | 100 | 230 | 34 | 210 | 32 |
| 11 | 0.10 | 1 | 5 | 380 | 100 | 225 | 33 | 205 | 28 |
| 12 | 0.10 | 1 | 5 | 380 | 100 | 210 | 30 | 190 | 27 |
| 13 | 0.10 | 1 | 5 | 380 | 100 | 215 | 29 | 200 | 25 |
| 14 | 0.10 | 1 | 5 | 380 | 100 | 200 | 28 | 180 | 25 |
| Comparative Example No. | | | | | | | | | |
| 1 | 0.10 | 1 | 5 | 330 | 100 | 180 | 30 | 120 | 10 |
| 2 | 0.10 | 1 | 5 | 480 | 100 | 200 | 30 | 100 | 10 |
| 3 | 0.10 | 1 | 5 | 380 | 100 | 205 | 31 | 120 | 12 |
| 4 | 0.10 | 1 | 5 | 380 | 100 | 200 | 32 | 130 | 8 |
| 5 | 0.10 | 1 | 5 | 380 | 100 | 170 | 28 | 50 | 5 |
| 6 | 0.10 | 1 | 5 | 380 | 100 | 190 | 27 | 3 | 2 |
| 7 | 0.10 | 1 | 5 | 380 | 100 | 200 | 30 | 10 | 4 |
| 8 | 0.10 | 1 | 5 | 380 | 100 | 200 | 29 | 5 | 3 |
| 9 | 0.10 | 1 | 5 | 380 | 100 | 180 | 25 | 6 | 4 |
| 10 | 0.10 | 1 | 5 | 380 | 100 | 180 | 26 | 7 | 2 |
| 11 | 0.10 | 1 | 5 | 380 | 100 | 200 | 27 | 8 | 3 |
| 12 | 0.10 | 1 | 5 | 380 | 100 | 150 | 25 | 5 | 2 |
| 13 | 0.10 | 1 | 5 | 380 | 100 | 180 | 26 | 50 | 5 |

We claim:

1. An electrode supporting conduit tube for electrical heating above 300° C. of underground hydrocarbon resources, which comprises:
   a metal conduit tube; and
   an insulating member adhered on and around the outer peripheral surface of said metal conduit tube, said insulating member being a laminated body of a web of glass fiber impregnated with water-dispersion varnish of PEEK, PPS or a combination thereof, that is hot-water resistant and is made up or particles ranging in size from 0.5 μm to 10 μm and a thermoplastic resin which is made up of particles ranging in size from 0.5 μm to 10 μm and a polyether/ether/ketone resin film, which is formed by first alternately winding said glass fiber web on said resin film on and around the outer peripheral surface of said metal conduit tube for a plurality of winding turns, and then subjecting both polyether-/ether/ketone resin film and glass fiber web thus wound on and around said metal conduit tube to shaping under heat and pressure at a heating temperature of from 350° C. to 450° C. and under a pressure of from 10 kg/cm$^2$ to 200 kg/cm$^2$ and wherein the rate of impregnation of glass fiber by said water dispersion varnish is 30% by weight wherein a final laminate structure is made of the metal conduit tube, PEEK and an impregnated glass cloth.

2. The electrode supporting conduit tube according to claim 1, wherein said glass fiber is in the form of woven cloth, tape, or roving.

3. The electrode supporting conduit tube according to claim 1, wherein said glass fiber is in the form of woven cloth, tape, or roving.

* * * * *